(12) United States Patent
Osakue et al.

(10) Patent No.: US 12,620,908 B2
(45) Date of Patent: May 5, 2026

(54) MODULAR MULTILEVEL CONVERTERS FOR BATTERY ENERGY STORAGE

(71) Applicant: Fluence Energy, LLC, Arlington, VA (US)

(72) Inventors: Efosa Charles Osakue, Birmingham (GB); Stefan Henninger, Obermichelbach (DE); Sung Pil Oe, Tonbridge (GB)

(73) Assignee: Fluence Energy, LLC, Arlington, VA (US)

( * ) Notice: Subject to any disclaimer, the term of this patent is extended or adjusted under 35 U.S.C. 154(b) by 29 days.

(21) Appl. No.: 18/124,880

(22) Filed: Mar. 22, 2023

(65) Prior Publication Data

US 2024/0322707 A1      Sep. 26, 2024

(51) Int. Cl.
*H02J 3/38* (2006.01)
*H01M 10/42* (2006.01)
(Continued)

(52) U.S. Cl.
CPC ....... *H02M 7/4807* (2013.01); *H01M 10/425* (2013.01); *H01M 50/209* (2021.01);
(Continued)

(58) Field of Classification Search
CPC ........... H02M 7/4807; H02M 3/33573; H02M 7/5387; H01M 10/425; H01M 50/209; H02J 3/32; H02J 3/38; H02J 7/0013
See application file for complete search history.

(56) References Cited

U.S. PATENT DOCUMENTS 8,310,104 B2    11/2012    Gengenbach et al.
8,482,155 B2     7/2013    Choi et al.
(Continued)

FOREIGN PATENT DOCUMENTS

CA          287255 A      2/1929
DE    102015212931 A1     1/2017
(Continued)

OTHER PUBLICATIONS

Umuhoza et al., "A SiC-based power electronics interface for integrating a battery energy storage into the medium (13.8 kV) distribution system," IEEE Applied Power Electronics Conference and Exposition (APEC), 8 pages [retrieved on Dec. 9, 2023], Retrieved from the Internet: https://par.nsf.gov/servlets/purl/10084324.
(Continued)

*Primary Examiner* — Rexford N Barnie
*Assistant Examiner* — Brian K Baxter
(74) *Attorney, Agent, or Firm* — BUCHANAN INGERSOLL & ROONEY PC

(57) ABSTRACT

A battery energy storage system includes a plurality of battery cores. Each battery core of the battery energy storage system includes an array of battery cubes, and each battery core is configured to provide a first direct current power at a first voltage. The battery energy storage system further includes a plurality of direct-current-to-direct-current (DC-DC) converters. Each DC-DC converter of the battery energy storage system is configured to accept the first direct current power and each DC-DC converter is configured to provide a second direct current power at a second voltage. The battery energy storage system further includes a main modular multilevel converter (MMC). The MMC of the battery energy storage system is configured to accept the
(Continued)

second direct current and to provide an alternating current at a third voltage.

21 Claims, 7 Drawing Sheets

(51) Int. Cl.

| | |
|---|---|
| *H01M 50/209* | (2021.01) |
| *H02J 3/32* | (2006.01) |
| *H02J 7/00* | (2006.01) |
| *H02M 3/335* | (2006.01) |
| *H02M 7/48* | (2007.01) |
| *H02M 7/5387* | (2007.01) |

(52) U.S. Cl.
CPC .................. *H02J 3/32* (2013.01); *H02J 3/38* (2013.01); *H02J 7/0013* (2013.01); *H02M 3/33573* (2021.05); *H02M 7/5387* (2013.01)

(56) References Cited

U.S. PATENT DOCUMENTS

| | | | |
|---|---|---|---|
| 8,766,474 B2 | 7/2014 | Carralero et al. | |
| 9,143,056 B2 | 9/2015 | Ilic et al. | |
| 9,425,681 B2 | 8/2016 | Tengner et al. | |
| 9,893,633 B1 | 2/2018 | Li et al. | |
| 9,906,057 B2 | 2/2018 | Guo et al. | |
| 9,966,777 B2 | 5/2018 | Guo et al. | |
| 9,985,473 B2 | 5/2018 | Mondal | |
| 9,991,713 B2 | 6/2018 | Tengner et al. | |
| 10,110,142 B2 | 10/2018 | Outram | |
| 10,193,380 B2 | 1/2019 | Mondal et al. | |
| 10,199,954 B2 | 2/2019 | Trainer et al. | |
| 10,243,370 B2 | 3/2019 | Garces et al. | |
| 10,396,682 B2 | 8/2019 | Götz et al. | |
| 10,505,369 B2 | 12/2019 | Sun et al. | |
| 10,873,208 B2 | 12/2020 | Mondal | |
| 10,937,190 B2 | 3/2021 | Lee et al. | |
| 11,038,435 B2 | 6/2021 | Götz | |
| 11,056,982 B2 | 7/2021 | Weyh et al. | |
| 11,139,530 B2 | 10/2021 | Rivera et al. | |
| 11,356,033 B2 | 6/2022 | Kuhn et al. | |
| 11,626,812 B2 | 4/2023 | Specht et al. | |
| 11,632,034 B2 | 4/2023 | Kacetl et al. | |
| 2007/0002536 A1 | 1/2007 | Hall et al. | |
| 2007/0188130 A1* | 8/2007 | Scheucher | H01M 10/441 |
| | | | 320/110 |
| 2010/0059270 A1 | 3/2010 | Yeh et al. | |
| 2012/0086399 A1 | 4/2012 | Choi | |
| 2014/0210419 A1 | 7/2014 | Kim | |
| 2014/0272515 A1* | 9/2014 | Maguire | H01M 10/625 |
| | | | 429/120 |
| 2015/0003009 A1 | 1/2015 | Moore et al. | |
| 2015/0055387 A1* | 2/2015 | Tengner | H02J 3/32 |
| | | | 363/132 |
| 2015/0069839 A1* | 3/2015 | Tengner | H02J 9/00 |
| | | | 307/48 |
| 2015/0194707 A1 | 7/2015 | Park | |
| 2015/0372517 A1 | 12/2015 | Lee | |
| 2016/0079755 A1* | 3/2016 | Triebel | H02J 3/32 |
| | | | 307/52 |
| 2017/0163043 A1* | 6/2017 | Garces | H02J 3/44 |
| 2017/0237355 A1* | 8/2017 | Stieneker | H02M 3/33584 |
| | | | 363/17 |

| | | | |
|---|---|---|---|
| 2017/0294633 A1 | 10/2017 | Zimbru, Jr. et al. | |
| 2018/0142935 A1 | 5/2018 | Jacobi | |
| 2018/0226900 A1* | 8/2018 | Xie | H02M 3/139 |
| 2020/0144845 A1 | 5/2020 | Facchini et al. | |
| 2020/0259330 A1* | 8/2020 | Dong | H02J 7/0018 |
| 2021/0036515 A1 | 2/2021 | Lehn et al. | |
| 2021/0281081 A1 | 9/2021 | Singer et al. | |
| 2021/0320507 A1* | 10/2021 | Hensley | H01M 10/441 |
| 2021/0354566 A1 | 11/2021 | Ben-Ari | |
| 2021/0376753 A1* | 12/2021 | Liu | H02M 7/2173 |
| 2021/0408935 A1 | 12/2021 | Specht et al. | |
| 2022/0006373 A1 | 1/2022 | Kacetl et al. | |
| 2022/0045510 A1* | 2/2022 | Cai | H02J 7/0048 |
| 2022/0094279 A1 | 3/2022 | Park et al. | |
| 2022/0103088 A1 | 3/2022 | Slepchenkov et al. | |
| 2022/0108364 A1 | 4/2022 | Sangaraju et al. | |
| 2022/0166343 A1* | 5/2022 | Zhang | H02M 1/325 |
| 2022/0200314 A1 | 6/2022 | Zhou et al. | |
| 2022/0294048 A1* | 9/2022 | Zhu | H01M 50/289 |
| 2022/0368126 A1* | 11/2022 | Zhang | H02H 3/087 |
| 2023/0024900 A1* | 1/2023 | Ayoola | B60L 55/00 |
| 2023/0318435 A1* | 10/2023 | Yuan | H02M 1/0074 |
| 2024/0030725 A1* | 1/2024 | Liu | H02J 3/38 |
| 2024/0088666 A1* | 3/2024 | Sul | H02M 7/4835 |

FOREIGN PATENT DOCUMENTS

| | | | |
|---|---|---|---|
| DE | 102016109077 A1 | 11/2017 |
| DE | 102017108099 B4 | 3/2019 |
| DE | 102017124126 B4 | 5/2019 |
| DE | 102018125728 B3 | 2/2020 |
| DE | 102020117264 B3 | 6/2021 |
| EP | 2847841 B1 | 8/2016 |
| EP | 3387745 B1 | 4/2020 |
| EP | 3544163 B1 | 9/2020 |
| EP | 3433126 B1 | 1/2021 |
| EP | 2913925 B1 | 3/2021 |
| EP | 3829046 A1 | 6/2021 |
| EP | 3053242 B1 | 9/2021 |
| EP | 3934073 A1 | 1/2022 |
| EP | 3940914 A1 | 1/2022 |
| EP | 3985821 A1 | 4/2022 |
| EP | 3985823 A1 | 4/2022 |
| WO | 2017009010 A1 | 1/2017 |
| WO | 2018189389 A1 | 10/2018 |
| WO | 2018222858 A1 | 12/2018 |
| WO | 2020007464 A1 | 1/2020 |
| WO | 2020108460 A1 | 6/2020 |
| WO | 2021105016 A1 | 6/2021 |
| WO | 2021217530 A1 | 11/2021 |
| WO | 2021226011 A1 | 11/2021 |
| WO | 2022079288 A1 | 4/2022 |
| WO | 2022079289 A1 | 4/2022 |

OTHER PUBLICATIONS

International Search Report and Written Opinion for International Application No. PCT/US2023/026411, mailed Oct. 11, 2023, 11 pages.

International Search Report and Written Opinion for International Application No. PCT/US22/44366, mailed Jan. 6, 2023, 13 pages.

International Search Report and Written Opinion for International Application No. PCT/US21/30551, mailed Aug. 13, 2021, 14 pages.

U.S. Appl. No. 17/810,983, dated Jul. 22, 2022, 54 pages.

Notice of Allowance for U.S. Appl. No. 17/810,983, dated Jun. 22, 2023, 9 pages.

\* cited by examiner

Battery Energy
Storage System 100

External Grid 113

Main
Modular
Multilevel
Converter
(MMC) 104

Main DC-DC-
Converter 158

110A

Storage Dispatch Unit (e.g.
Power Controller) 105

Battery Energy Storage System (e.g., Array) 200

Battery Cube

Battery Elements 310A-F
(e.g., Battery Racks)

Battery Element 310A (e.g.,
Battery Rack)

Battery Cells 312A-N

Battery Cell 312A

MODULAR MULTILEVEL CONVERTERS FOR BATTERY ENERGY STORAGE

TECHNICAL FIELD

The present subject matter relates to examples of modular multilevel voltage converters in battery energy storage systems and energy provisioning systems at large.

BACKGROUND

A battery energy storage system, or any energy provisioning system with a number of relatively low voltage energy provisioning devices, will often utilize a step-up component or circuit with a transformer to step the low voltage provided by the system to a high voltage. The higher voltage, and consequently lower amperage electricity, is better situated to travel across long electrical-lined distances, or to conform to the amperage requirements of a large connected load or electrical grid. The step-up component will often also convert a direct current (DC) from the battery energy storage system to an alternating current (AC) using an inverter, to conform with the electrical line or electrical grid.

Battery energy storage systems, as well as some energy provisioning systems, are often set up in a distributed manner to satisfy safety and economical concerns: several hundred batteries are used rather than one single massive battery.

Traditionally, battery energy storage systems, and distributed energy provisioning systems in general, would utilize a number of converters and multiple step-up transformers across the system: for example, a system with one thousand batteries may include one hundred step-up transformers, each of which converts low voltage DC power from ten batteries into high-voltage power. Then, the hundred step up-converters feed into ten additional step-up transformers, each of which converts high voltage DC power from the ten step-up transformers into higher high-voltage power, and may feed into an inverter to convert the DC power into AC power. The output from these ten step-up transformers (and inverter) would then be pushed into the electrical grid. However, as the number of step-up transformers increase, the number of computer systems required to manage, control, and synchronize the step-up transformers increases proportionally. The costs to provision all of the step-up transformers also increase proportionally to the number of batteries.

SUMMARY

Hence, there in a need for systems directed to converting distributed direct current low voltage power into centralized alternating current high voltage power. The modular multilevel conversion technologies disclosed herein are able to receive direct current power from an array of batteries, and provide high voltage alternating current power, with an overall reduction in the number of transformers required, improved power availability, and centralized control of power. Centralizing the control of power by utilizing the modular multilevel conversion technologies can reduce the total harmonic distortion to and from an electrical grid, and also improves robustness and redundancy of the overall array of batteries, in particular the power production and reception of the array of batteries.

In a first example, a battery energy storage system includes a plurality of battery cores, wherein each battery core includes an array of battery cubes and is configured to provide a first direct current power at a first voltage. The battery energy storage system further includes a plurality of direct-current-to-direct-current (DC-DC) converters, wherein each DC-DC converter is configured to accept the first direct current power and to provide a second direct current power at a second voltage. The battery energy storage system still further includes a main modular multilevel converter (MMC) configured to accept the second direct current and to provide an alternating current at a third voltage.

In a second example, an energy provisioning system includes a plurality of power sources, wherein each power source is configured to provide a first direct current power at a first voltage. The energy provisioning system further includes a plurality of direct-current-to-direct-current (DC-DC) converters, wherein each DC-DC converter is configured to accept the first direct current power and to provide a second direct current power at a second voltage. The energy provisioning system still further includes a main modular multilevel converter (MMC) configured to accept the second direct current and to provide an alternating current at a third voltage.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations in accordance with the present concepts, by way of example only, not by way of limitations. In the figures, like reference numerals refer to the same or similar elements.

DETAILED DESCRIPTION

Figure 1:
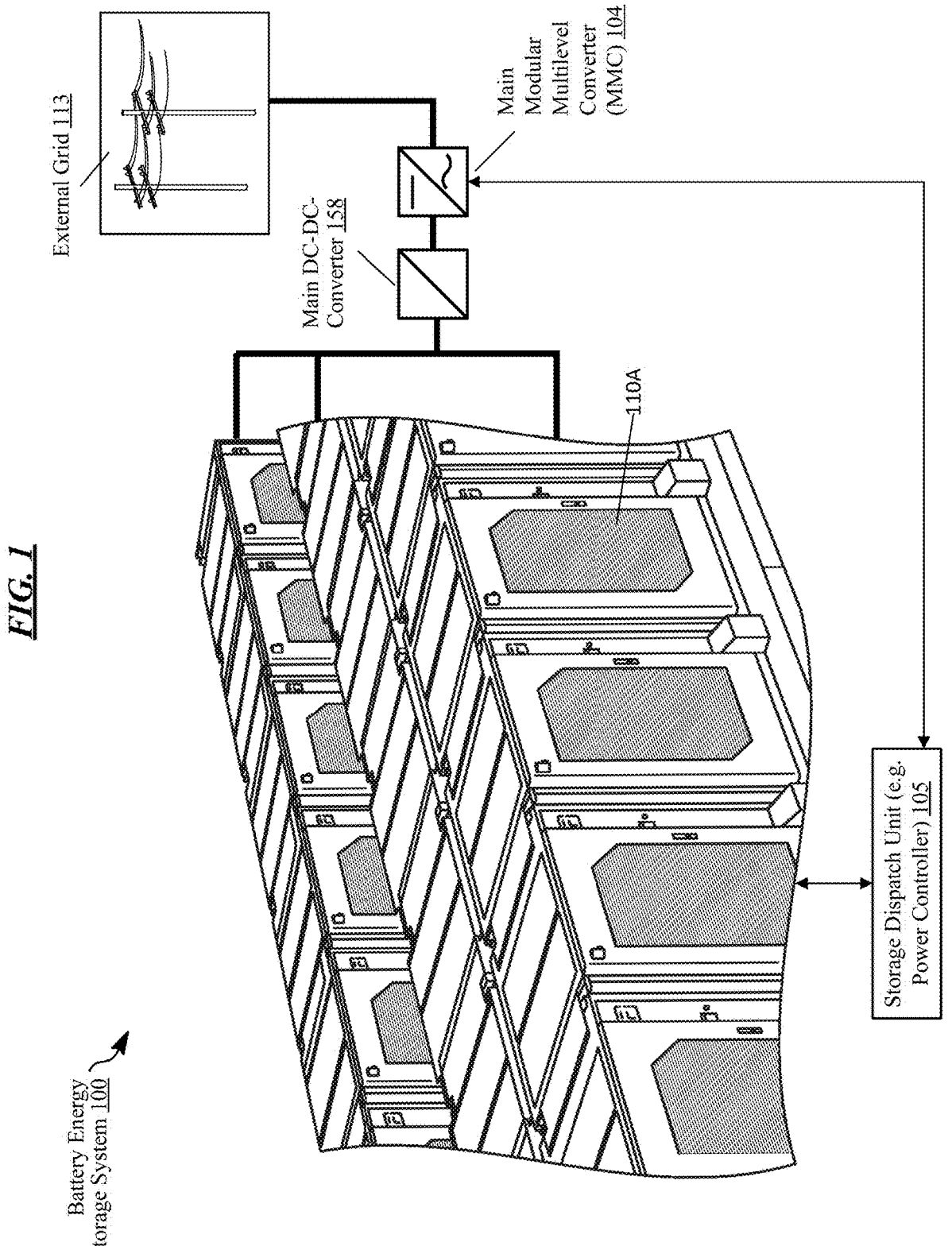
FIG. 1 is an isometric view of a battery energy storage system that includes multiple battery submodules with isolated DC-DC converters, and a modular multilevel converter (MMC).

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, transfer functions, and/or circuitry have been described at a relatively high-level, without detail, in order to avoid unnecessarily obscuring aspects of the present teachings.

The term "coupled" as used herein refers to any logical, physical, electrical, or optical connection, link or the like by which signals or light produced or supplied by one system element are imparted to another coupled element. Unless described otherwise, coupled elements or devices are not necessarily directly connected to one another and may be separated by intermediate components, elements, or communication media that may modify, manipulate, or carry the light or signals.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount. The terms "approximately" and "substantially" mean that the parameter value or the like varies up to ±10% from the stated amount.

The orientations of the battery nodes, cores, arrays, racks, elements, modules, or cells; associated components; circuits; and/or any complete devices, such as battery energy storage systems, incorporating battery nodes, racks, elements, modules, or cells such as shown in any of the drawings, are given by way of example only, for illustration and discussion purposes. In operation for a particular battery energy storage application, a battery node, core, array, rack, element, module, or cell may be oriented in any other direction suitable to the particular application of the battery energy storage system, for example upright, sideways, or any other orientation. Also, to the extent used herein, any directional term, such as left, right, front, rear, back, end, up, down, upper, lower, top, bottom, and side, are used by way of example only, and are not limiting as to direction or orientation of any energy storage system or battery nodes, racks, elements, modules or cells; or component of an energy storage system or battery node, rack, element, module, or cell examples illustrated in the accompanying drawings and discussed below. Further, to the extent used herein, any geometric shape term, or description of an object's external boundary, outline, or external surface, such as cube, rack, square, sphere, circle, ring, and array, are not limiting as to direction or orientation of any energy storage system or battery nodes, cubes, racks, elements, modules or cells; or component of an energy storage system or battery node, cube rack, element, module, or cell examples illustrated in the accompanying drawings and discussed below, unless otherwise explicitly required.

Unless otherwise indicated, any multiplicity of components, such as battery modules (e.g., cubes) 110A-N, battery elements 310A-F, battery cells 312A-N, core DC-DC converters 258A-N, 558A-N, dual-active bridge converters 405A-B, submodules 475A-Z-480A-Z, transformers 425A-N, submodules 575A-H-578A-H, 579A-L, 580A-Z, and core MMC 505A-B, can include any number of said components, including as few as one, and are not limited by the depicted number of components. Unless otherwise indicated, any coupled electrical components can be linked in series or in parallel. In the case of switches 415A-H or submodules 475A-Z-480A-Z, 575A-H-578A-H, 579A-L, 580A-Z, the component may be linked in both series and/or in parallel, depending upon the state of the switch or submodule.

FIG. 1 is an isometric view of a battery energy storage system 100. The battery energy storage system 100 includes multiple battery modules (e.g., cubes) 110A-N connected to a main modular multilevel converter (MMC) 104. The battery modules 110A-N include batteries of any existing or future reusable battery technology including lithium ion or flow batteries. The battery modules 110A-N, collectively and individually, are capable of providing direct current electricity to an external load, and thereby discharging, as well as are capable of receiving direct current electricity from an external source, and thereby charging.

To facilitate providing and receiving direct current, the battery modules 110A-N are connected to the main MMC 104. The main MMC 104 is configured to standardize power inputs and outputs to and from the battery modules 110A-N. As the battery modules 110A-N provide direct current, the main MMC 104 transforms direct current into alternating current for use by the external grid 113 and normalizes the amperage from the battery modules 110A-N to the external grid 113. Additionally, as the battery modules 110A-N require direct current, the main MMC 104 transforms alternating current into direct current from the external grid and normalizes the amperage from the external grid 113 to the battery modules 110A-N.

In some examples, the main MMC 104 embodies a main DC-DC converter 158, or one or more separate main DC-DC converters 158, connected between the main MMC 104 and the battery modules 110A-N. The main DC-DC converter 158, when separate from the main MMC 104, can step the voltage experienced at the main MMC 104 connection end down to the voltage expected at the battery modules 110A-N connection end, as well as stepping up the voltage from the battery modules 110A-N connection end to the voltage expected at the main MMC 104 connection end. When the main DC-DC converter 158 is embodied within the main MMC 104, the combined main MMC 104 with the embodied main DC-DC converter 158 can step the voltage experienced at the external grid 113 connection end down to the voltage expected at the battery modules 110A-N connection end, as well as stepping up the voltage from the battery modules 110A-N connection end to the voltage expected at the external grid 113 connection end.

The main MMC 104 is depicted with a single connection to the external grid 113 to the main MMC 104: in scenarios where the external grid 113 is complex and connects to multiple energy sources and connected loads, such as a power grid with consumption devices, a single connection to the battery energy storage system 100 can either absorb energy produced by the energy sources of the external grid 113 in excess of the demand of the connected loads of the external grid 113, or provide energy to the connected loads of the external grid 113 in excess of the capacity of the energy sources of the external grid 113. Alternatively, separate lines may run to a segregated energy source as well as to connected loads or the external grid 113: separate lines may be advantageous in scenarios where the segregated energy source is inconsistent, such as a wind or solar-based energy source. In such scenarios, the power from the energy source is pushed to the battery modules 110A-N via the main MMC 104, which then either charge or discharge, and provide consistent energy to the connected loads or external grid 113 via another electrical route from the main MMC 104.

An energy source can be any suitable system for producing electrical energy, such as a turbine or photovoltaic cell. The external grid 113 can include a power grid or a smaller local load such as a backup power system for a facility such as a hospital, manufacturing site, residential home, or other suitable facility.

The main MMC 104 can facilitate normalizing input or output wattage or voltage, in order to provide consistent output and protect the battery modules 110A-N or external grid 113 from damage. The main MMC 104 may perform this normalization in concert with a storage dispatch unit 105. The storage dispatch unit 105 can also communicate with and control the main DC-DC converter 158 as well as core DC-DC converters 258A-N 558A-N (see FIGS. 4-7) in order to adjust electrical output from the battery modules 110A-N, as well as electrical capacity or intake via the DC-DC converter 158 or core DC-DC converters 258A-N 558A-N to the battery modules 110A-N. The storage dispatch unit 105 may operate completely independently at a battery module 110A level, in a fully centralized manner, or in some combination of independent and centralized operation.

Generally, the battery modules 110A-N of the battery energy storage system 100 connected to the main MMC 104 operate in concert: either providing power to the external grid 113 and discharging, or receiving power from the external grid 113 and charging. This concerted effort is coordinated by a storage dispatch unit 105, and other control units such as market dispatch units or real-time automation controllers, not depicted here. Further methods and systems related to the management and maintenance of the battery modules 110A-N of the battery energy storage system 100 are disclosed in U.S. application Ser. No. 17/810,983, filed on Jul. 6, 2022, titled "Cell and Rack Performance Monitoring System and Method," the entirety of which is incorporated by reference herein.

Figure 2:
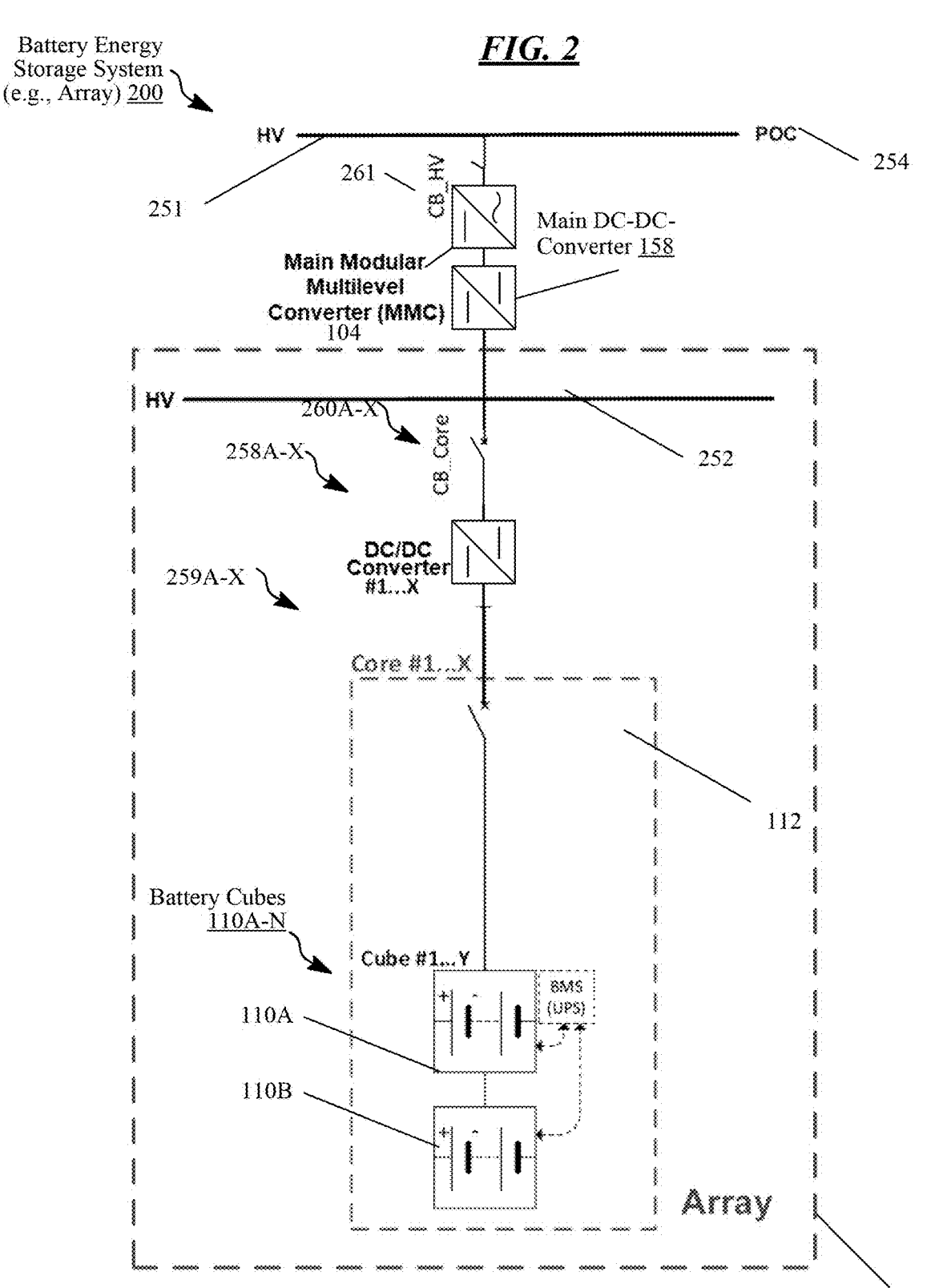
FIG. 2 is an electrical diagram of a battery energy storage system similar to that of FIG. 1 depicting information and working power flows.

FIG. 2 is an electrical diagram of a battery energy storage system 200 similar to the battery energy storage system 100 of FIG. 1 depicting information and working power flows.

The battery energy storage system 200 connects to an electrical grid 113, via a main high voltage (HV) bus 251, which is an electrical bus rated and intended for high voltage matching the voltage expected by the electrical grid 113. The main HV bus 251 can allow for multiple battery energy storage systems 200 or power storage or generating facilities to be linked in series or in parallel before connecting to an electrical grid 113 via a point of connection (POC) 254.

The battery energy storage system 200 includes an optional HV circuit breaker 261, designed to selectively isolate the remainder of the battery energy storage system 200 from the main HV bus 251. The HV circuit breaker 261 may be hardwired to trip under certain circumstances, or the HV circuit breaker 261 may be controlled by the power plant controller 212 or other controllers, including protective relays.

The main MMC 104 is coupled between the main HV bus 251 and an array HV bus 252. The main MMC 104 converts the alternating current provided by the main HV bus 251 into direct current at the optional main DC-DC converter 158, and converts direct current provided by the main DC-DC converter 158 into alternating current at the main HV bus 251. If the optional main DC-DC converter 158 is not included, the main MMC 104 converts the alternating current provided by the main HV bus into direct current at the array HV bus 252, and converts direct current provided by the array HV bus 252 into alternating current at the main HV bus 251.

The main DC-DC converter 158 steps the voltage experienced at the MMC 104 connection end 251 up to the voltage expected at the array HV bus 252 connection end, as well as stepping down the voltage from the array HV bus 252 connection end to the voltage expected at the main MMC 104 connection end.

The array HV bus 252 is within the bounds of the array 262. While multiple arrays 262 may be coupled in series or in parallel to the array HV bus 252, in this example only a single array 262 is depicted.

A core 259A is coupled to the array HV bus 252 by a core DC-DC-converter 258A and a core circuit breaker 260A. Multiple cores 259A-X are connected to a single array HV bus 252, each with a respective core DC-DC converter 258A-X and respective core circuit breaker 260A-X: in this figure, only a single core 259A is depicted in detail.

The core circuit breaker 260A is optional, and designed to selectively isolate the remainder of the core 259A from the array HV bus 252. The core circuit breaker 260A may be hardwired to trip under certain circumstances, or the core circuit breaker 260A may be controlled by the storage dispatch unit 105 or other controllers.

The core DC-DC converter 258A is coupled between the array HV bus 252 and the core 259A. The DC-DC converter 258A can step the voltage experienced at the array HV bus 252 connection end down to the voltage expected at the core 259A connection end, as well as stepping up the voltage from the core 259A connection end to the voltage expected at the array HV bus 252 connection end.

Figure 3:
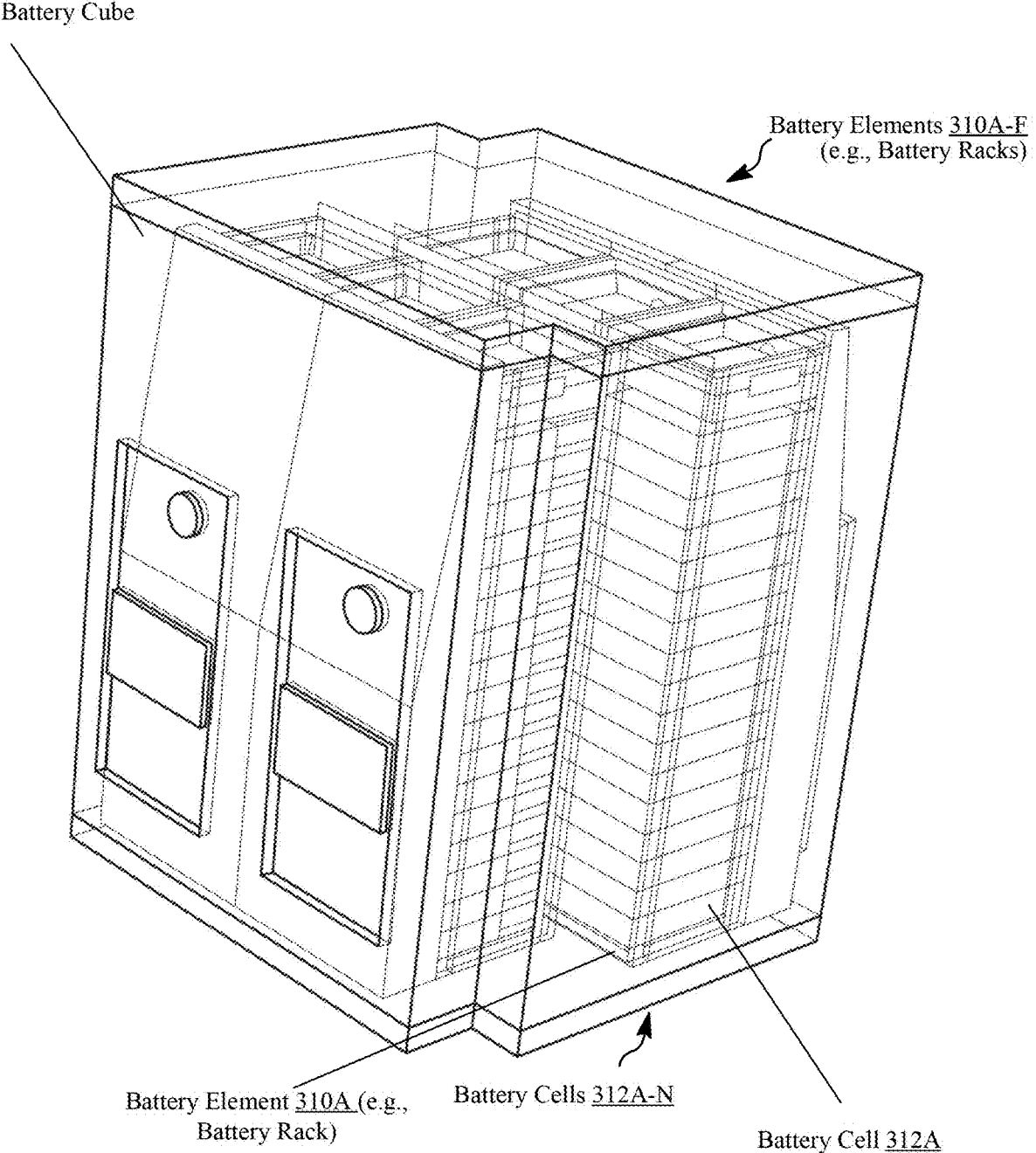
FIG. 3 is an isometric translucent view of the battery modules (e.g., cubes) of FIG. 1 that includes multiple battery elements of multiple battery cells.

FIG. 3 is an isometric view of a battery module 110A or cube that includes multiple battery elements 310A-F of multiple battery cells 312A-N. The battery module 110A stores a plurality of battery elements 310A-F. The battery module 110A is both a physical collection of battery elements 310A-F, as well as a logical and electrical collection of battery elements 310A-F: the battery module 110A physically houses the battery elements 310A-F, and the electrical performance of the battery elements 310A-F within the battery module 110A may be attributed to the battery module 110A itself. For example, if a battery element 310A is able to store one hundred and two kilowatt hours of energy, and the battery module 110A contains six battery elements 310AF, then the battery module 110A may be understood to and be described as storing six hundred and twelve kilowatt hours of energy. A battery module 110A may contain greater or fewer numbers of battery elements 310A than depicted in the figure.

A given battery element 310A contains multiple battery cells 312A-N. Much like the relationship between a battery module 110A and contained battery elements 310A-F, the battery element 310A is both a physical collection of battery cells 312A-N as well as a logical and electrical collection of battery cells 312A-N. As an example, if a battery cell 312A is able to store six kilowatt hours of energy, and the battery element 310A contains seventeen battery cells 312A-N, then the battery element 310A may be understood to and be described as storing one hundred and two kilowatt hours of energy. A battery element 310A may contain greater or fewer numbers of battery cells 312A than depicted in the figures.

As the battery element 310A is a logical and electrical collection of battery cells 312A-N, the collection is not defined by the physical structure or ordering of the battery cells 312A-N. Therefore, the battery element 310A may be alternatively described as a battery rack, a battery sub-rack, or a battery array: each of these terms (element, rack, sub-rack, array) can be categories of battery element 310A: a battery element 310A is the logical and electrical collection of battery cells 312A-N, without explicit regard for physical structure or ordering of the battery cells 312A-N. In some implementations, a finer level of encapsulation exists within the battery cell 312A, which may be identified as a battery sub-cell within the battery cell 312A, comprising prismatic, pouch, or cylindrical battery cells.

The battery module 110A or cube represents a single physical fixture, which may be limited in maximum size by the mass or volume a person, forklift, or vehicle is capable of transporting as a singular, atomic unit. The battery element 310A within the battery module 110A represents an organizational structure for organizing and stacking battery cells within the battery module 110A. A battery cell 312A is generally the largest unit of manufacture a battery producer can produce capable of charging and discharging electricity at a chemical level. In some examples battery cells 312A-N are packaged together, representing the smallest unit a particular operator would remove or replace in the energy storage system 100: in examples where a multiple battery cells are packaged together, the individual battery cells are too small or sensitive to perform on-site particularized maintenance, and instead the entire package of battery cells 312A-N is either collectively repaired or replaced.

The battery module 110A may resemble the features presented in the energy storage system described in International Application No. PCT/US2021/30551, filed on May 4, 2021, titled "Energy Storage System with Removable, Adjustable, and Lightweight Plenums," the entirety of which is incorporated by reference herein.

Figure 4:
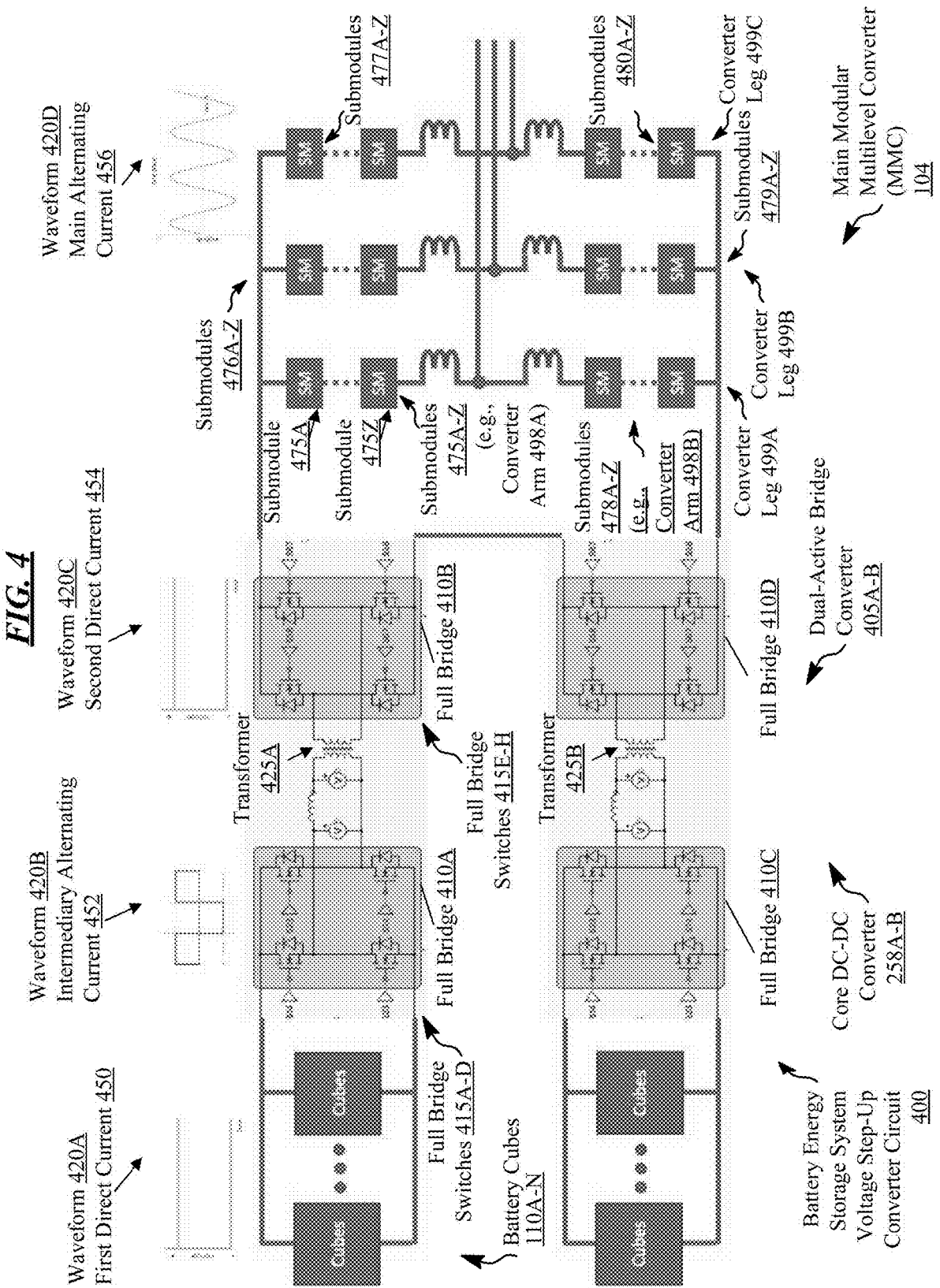
FIG. 4 is a high-level circuit diagram of a battery energy storage system (BESS) voltage step-up converter circuit based on dual-active bridge converters and an MMC.

FIG. 4 is a high-level circuit diagram of a battery energy storage system (BESS) voltage step-up converter circuit 400 based on core DC-DC converters 258A-B connected to transformers 425A-B implemented as dual-active bridge converters 405A-B and a main MMC 104. The core DC-DC converters 258A-B provide electrical isolation between the battery modules 110A-N and the electrical grid 113. Any buses, such as main HV bus 251 or array HV bus 252, as well as main DC-DC converter 158, have been omitted for clarity. Array HV bus 252 may constitute the connection between dual-active bridge converters 405A-B. Between the main MMC 104 and the dual-active bridge converters 405A-B, another layer of converters constituting main DC-DC converter 158 may be inserted to service one or more dual-active bridge converters 405A-B and their respective battery modules 110A-N.

The battery modules 110A-N are connected either in series or in parallel to a core DC-DC converter 258A. In this example, the core DC-DC converter 258A is implemented as a dual-active bridge converter 405A, and the battery modules 110A-N are connected to a full bridge 410A of the dual-action bridge converter 405A. A dual-active bridge converter 405A is a type of bidirectional DC-DC converter 258A with identical first and second full-bridges 410A-B on either side. The two legs of both full-bridges 410A-B are driven with complimentary square-wave pulses. Power flow in the dual-active bridge converter 405A can be directed by phase-shifting the pulses of one full bridge 410A with respect to the other full bridge 410B using phase shift modulation. The leading full bridge 410A delivers power to the lagging full bridge 410B. The applied square waves to the full bridges 410A-B create a voltage differential across the energy transfer inductance and direct its stored energy. Alternatively, the dual-active bridge converters 405A-B can consist of three phases, and the transformers, and the transformers 425A-B can be three phase transformers, or any type of alternating current transformer: higher phase cardinalities, such as four phase, five phase, etc., are contemplated.

The two full bridges 410A-B communicate energy via magnetism in the transformer 425A between the full bridges 410A-B. Utilizing magnetism galvanically isolates the battery modules 110A-N, preventing current from flowing between the battery modules 110A-N and the electrical grid 113. The transformer 425A is also configured to step the voltage, moving the voltage from full bridge 410A up to full bridge 410B, and moving the voltage from full bridge 410B down to full bridge 410A. Consequently, the voltage on the full bridge 410A side of the core DC-DC converter 258A is a relatively lower voltage, while the voltage on the full bridge 410B side of the core DC-DC converter 258A is a relatively higher voltage. The core DC-DC converter 258A can connect to other core DC-DC converters 258B, either in series or in parallel. Such connections are functionally equivalent to the core HV bus 252. In circumstances where multiple DC-DC converters 258A-B are connected, in particular when connected in series, the overall voltage required on the full bridge 410B,D sides of the core DC-DC converters 258A-N (see FIG. 6) may be lower than what is commutatively provided by the full bridge 401A,C sides of the core DC-DC converters 258A-N. In such circumstances, the transformer 425A-N can be configured to move the voltage from full bridge 410A,C down to full bridge 410B, D, and move the voltage from full bridge 410B,D up to full bridge 410A,C, in order for the appropriate voltage to be experienced across multiple DC-DC converters 258A-N on their respective full bridges 410B,D connecting to the main MMC 104 or core HV bus 252. The transformer 425A can be configured as a 1:1 transformer, which does not step up or down the voltage in either, but still provides galvanic isolation.

The core DC-DC converters 258A-B ultimately connect to the main modular multilevel converter (MMC) 104. The main MMC 104 is made up of submodules 475A-Z-480A-Z. The main MMC 104 has two to three tasks to perform. First, the main MMC 104 must create sinusoidal alternating current from direct current provided by the core DC-DC converters 258A-B. Second, the main MMC 104 must create three-phase alternating current from the direct current provided by the core DC-DC converters 258A-B. Third, the main MMC 104 may need to increase the voltage of the electricity provided by the core DC-DC converters 258A-B. The MMC may embody or connect to a main DC-DC converter 158 between the core DC-DC converters 258A-B. The main DC-DC converter 158, if used, can alternatively or additionally be connected as a three phase transformer between the main MMC 104 and the external grid 113. The main DC-DC converters 158 in any implementation be three phase transformers, or any type of alternating current transformer: higher phase cardinalities, such as four phase, five phase, etc., are contemplated. The main MMC 104, along with any main DC-DC converters 158, are bidirectional in each of these tasks.

The submodules 475A-Z-480A-Z are either half or full bridges, with a given submodule 475A capable of affecting the waveform of the electricity passing through that submodule 475A. Two or more submodules 475A-B can also change the voltage of the electricity passing through the submodules 475A-B, much like the core DC-DC converters 258A-B.

The main MMC 104 creates sinusoidal alternating current by using a large number of submodules 475A-Z, 478A-Z for a given alternating current phase. Each submodule 475A-Z opens and closes in a slightly offset pattern, and generates different voltages. The submodules 475A-Z are built with two unipolar and bidirectional solid-state switches (e.g., an insulated-gate bipolar transistor (IGBT) or metal-oxide-semiconductor field-effect transistor (MOSFET)) and a capacitor. The main MMC 104 utilizes these submodules 475A-Z in series with an inductor to form a converter arm 498A, a second converter arm 498B made of submodules 478A-Z in combination with the first converter arm 498A constitutes a converter leg 499A. Converter leg 499A in combination with a second converter leg 449B (made up of submodules 476A-Z and submodules 479A-N) and a third converter leg 499C (made up of submodules 477A-Z and submodules 480A-N) comprise the main MMC 104 in a three-phase configuration.

The role of the two unipolar and bidirectional solid-state switches is to either insert or bypass their respective capacitor. The capacitor functions as the voltage source, and the submodules 475A-Z may therefore exhibit two voltage levels: zero volts when the capacitor is bypassed, or nonzero volts when the capacitor is inserted.

By using submodules 475A-Z with a high granularity, and more submodules 475A-Z with larger voltage thresholds, the storage dispatch unit 105 opening and closing submodules 475A-Z can approximate the positive values of a sinusoidal wave, by increasing the voltage provided from zero to the maximum value by opening and closing submodules 475A-Z with summed voltage values approximately equal to a sine value at a given time. By using submodules 478A-Z in a complimentary manner the storage dispatch unit 105 can approximate the negative values of the same sinusoidal wave. Thus, by using submodules 475A-Z, 478A-Z, the storage dispatch unit 105 can convert the second direct current 454 into the main alternating current 456.

Submodules 475A-Z, 478A-Z are configured to create a single sinusoidal wave of alternating current. In order to provide or accept the three-phase alternating current provided by the electrical grid 113, a second set of submodules 476A-Z 479A-Z and a third set of submodules 477A-Z, 480A-Z are configured to also process single sinusoidal waves of alternating current. By evenly phase shifting the three single sinusoidal waves of alternating current, three-phase alternating current is achieved, and provided to the electrical grid 113.

The number of submodules 475A-Z, 478A-Z can be as many or as few as are required to create a sufficiently detailed digital approximation of an analog sinusoidal wave. This number may be approximately one hundred to one hundred and sixty submodules, but any number of submodules on a given converter arm 498A-B or converter leg 499A-C are contemplated.

The electricity flowing through the BESS voltage step-up converter circuit 400 therefore goes through several states and waveforms. When flowing from the battery modules 110A-N to the electrical grid 113, the electrical energy flows from the battery modules in a flat, direct current waveform 420A, at a low voltage first direct current 450. The first direct current 450 is transformed by the full bridge 410A, which converts the waveform 420A into a square wave waveform 420B, which is an intermediary alternating current 452. As the intermediary alternating current 452 passes across the transformer 425A, the waveform 420B is unchanged, but the voltage of the intermediary alternating current is increased, while the amplitude is decreased, thereby converting the power from low voltage to high voltage. As the high-voltage intermediary alternating current 452 meets the full bridge 410B, the full bridge 410B is opening and closing switches 415E-H in a complimentary pattern to the full bridge switches 415A-D of the full bridge 410A, thereby cancelling out the peaks and troughs of the intermediary alternating current 452, returning to a flat, direct current waveform 420C; albeit with a higher voltage in that second direct current 454 than is present in the first direct current 450 (unless multiple dual-active bridge converters 405A-N are connected and produce a higher voltage than the main MMC 104 expects, or if the dual-active bridge converters 405A-N are configured as 1:1 transformers, as discussed above). The second direct current 454 is provided to the first set of submodules 475A-Z, 478A-Z, the second set of submodules 476A-Z, 479A-Z, and the third set of submodules 477A-Z, 480A-Z, with each set wired in parallel to one another. A given set of submodules 475A-Z, 478A-Z opens and closes switches in order to meter the voltage output of the overall set of submodules 475A-Z, 478A-Z to form a sinusoidal voltage pattern, thereby forming the waveform 420D, and a single phase of the main alternating current 456. The other two sets of submodules 476A-Z, 479A-Z, 477A-Z, 480A-Z perform the same task, but in two distinct phases, thereby forming three sinusoidal voltage waves constituting three-phase alternating current.

Therefore, FIGS. 1, 2, and 4 depict a battery energy storage system (BESS) 100 including a plurality of battery cores 259A-X, wherein each battery core 259A-X includes an array of battery cubes 110A-N, and each battery core 259A-X is configured to provide a first direct current 450 power at a first voltage. The BESS 100 further includes a plurality of direct-current-to-direct-current (DC-DC) converters 258A-B, wherein each DC-DC converter 258A-B is configured to accept the first direct current 450 power and provide a second direct current 454 power at a second voltage. The BESS 100 further includes a main modular multilevel converter (MMC) 104 configured to accept the second direct current 454 power and provide an alternating current 456 at a third voltage.

In some examples, at least one DC-DC converter 258A of the plurality of DC-DC converters 258A-B can comprise a dual-active bridge converter 405A. The first or main alternating current 456 can be three-phase electric power. Each core DC-DC converter 258A-B can be configured to provide the second voltage of the second direct current 454 power at a set voltage level. The BESS 100 can include a storage dispatch unit or power controller 105, configured to adjust the second voltage provided by the DC-DC converters 258A-B at the battery cubes 110A-N. Therefore, the core DC-DC converter 258A-B can coordinate with the transformer 425A, the battery modules 110A, and/or the storage dispatch unit 105 to alter the voltage experienced where the full bridge 410B connects to the main MMC 104. The core DC-DC converters 258A-B are configured to offer bidirectional flow.

In some examples, the first voltage of each battery core 110A-N going into the full bridge 410A is a low voltage. The second voltage coming out of the full bridge 410B into the main MMC 104 is a high voltage, and the voltage coming from the main MMC 104 towards the electrical grid 113 is a high voltage. The voltage coming from the main MMC 104 towards the electrical grid 113 may be a higher high voltage than the second voltage, or it may be a lower high voltage than the second voltage. The second voltage coming out of the full bridge 410B into the main MMC 104 is a first high voltage, and the voltage coming from the main MMC 104 towards the electrical grid 113 is a second high voltage.

When the BESS 100 is extrapolated and generalized to a more generic energy provisioning system, FIGS. 1, 2, and 4 depict an energy provisioning system as the BESS 100, including a plurality of power sources as the battery cores 259A-X, wherein each power source is configured to provide a first direct current 450 power at a first voltage. Though the plurality of power sources are depicted as battery cores 259A-X, the plurality of power sources can include battery, solar, wind, thermal, other renewables, nuclear, fossil fuel power sources, or a combination thereof. The energy provisioning system further includes a plurality of direct-current-to-direct-current (DC-DC) converters 258A-B, wherein each DC-DC converter 258A-B is configured to accept the first direct current 450 power and provide a second direct current 454 power at a second voltage. The energy provisioning system further includes a main modular multilevel converter (MMC) 104 configured to accept the second direct current 454 power and provide an alternating current 456 at a third voltage.

In some related examples, at least one DC-DC converter 258A of the plurality of DC-DC converters 258A-B can comprise a dual-active bridge converter 405A. The first or main alternating current 456 can be three-phase electric power. Each core DC-DC converter 258A-B can be configured to provide the second voltage of the second direct current 454 power at a set voltage level. The BESS 100 can include a storage dispatch unit or power controller 105, configured to adjust the second voltage provided by the DC-DC converters 258A-B at the battery cubes 110A-N. Therefore, the core DC-DC converter 258A-B can coordinate with the transformer 425A, the battery modules 110A, and/or the storage dispatch unit 105 to alter the voltage experienced where the full bridge 410B connects to the main MMC 104. As the power sources are not batteries, the power sources may not have the capacity to accept energy, only to provide it. In those examples, the core DC-DC converters 258A-B are configured to offer unidirectional flow.

In some examples, the first voltage of each battery core 110A-N going into the full bridge 410A is a low voltage. The second voltage coming out of the full bridge 410B into the main MMC 104 is a high voltage, and the voltage coming from the main MMC 104 towards the electrical grid is a high voltage. The voltage coming from the main MMC 104 towards the electrical grid 113 may be a higher high voltage than the second voltage, or it may be a lower high voltage than the second voltage. The second voltage coming out of the full bridge 410B into the main MMC 104 is a first high voltage, and the voltage coming from the main MMC 104 towards the electrical grid 113 is a second high voltage.

Figure 5:
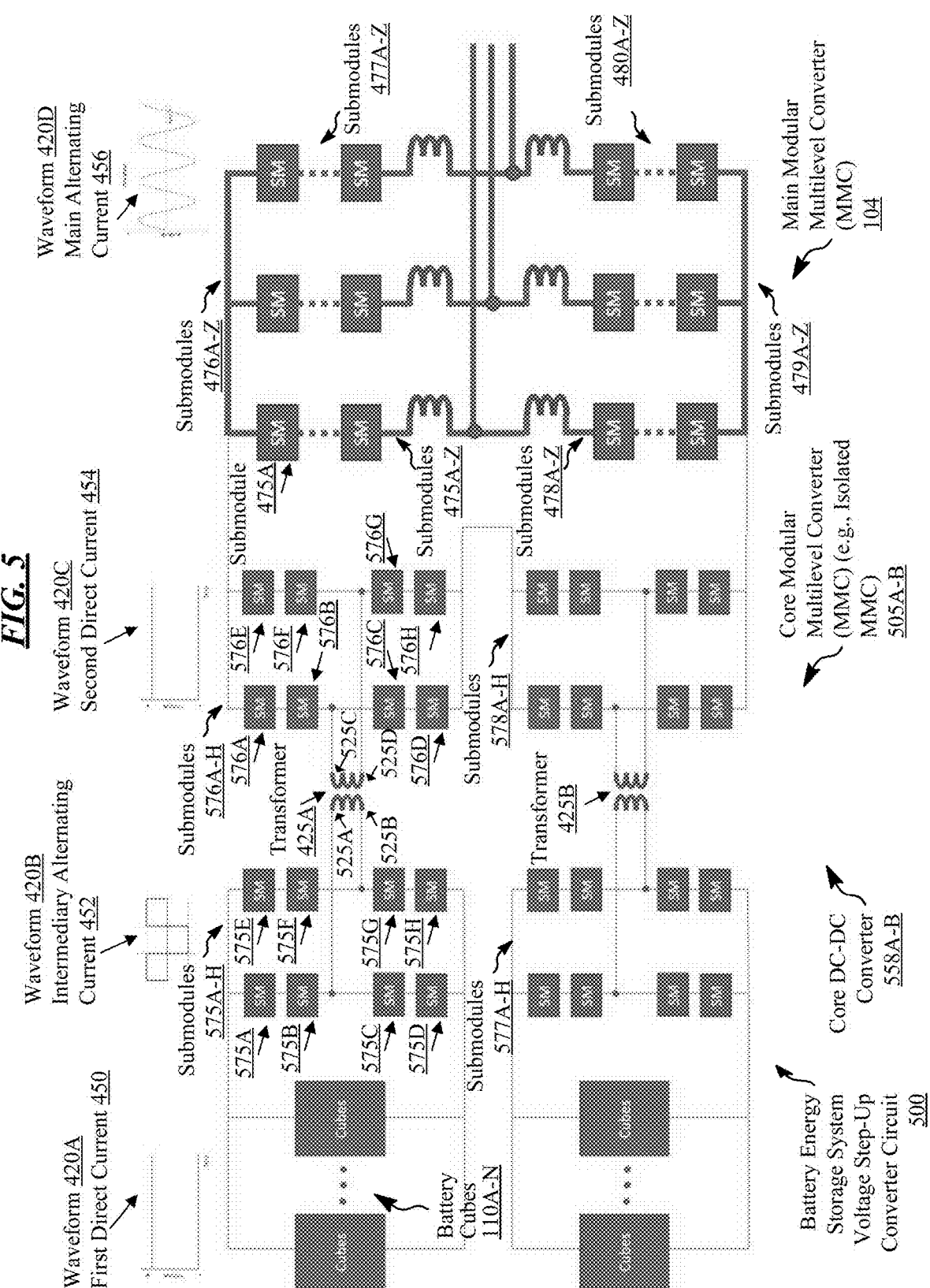
FIG. 5 is a high-level circuit diagram of a battery energy storage system (BESS) voltage step-up converter circuit based on core-level MMCs and a main MMC.

FIG. 5 is a high-level circuit diagram of a battery energy storage system (BESS) voltage step-up converter circuit 500 based on core DC-DC converters 558A-B implemented as isolated or core modular multilevel converters 505A-B and a main MMC 104. The core DC-DC converters 558A-B provide electrical isolation between the battery modules 110A-N and the electrical grid 113.

The BESS voltage step-up converter circuit 500 functions substantially similarly to the BESS voltage step-up converter circuit 400 of FIG. 4. The battery modules 110A-N, transformers 425A-B, electric grid 113, and main MMC 104 comprising submodules 475A-Z-480A-Z are functionally the same, expect the same types of commands and electrical inputs and outputs, and perform the same service. Consequently, the waveforms 420A-D of the power as it flows from the battery modules 110A-N to the electrical grid 113, and from the electrical grid 113 to the battery modules 110A-N, are the same. Any voltage step-ups and voltage step-downs, as well as the waveform changes between the first direct current 450, the intermediary alternating current 452, the second direct current 454, and the main alternating current 456, as well as the combination of the main alternating current 456 in triplicate to achieve three-phase alternating current, are the same. The differences between the BESS voltage step-up converter circuit 500 and the BESS voltage step-up converter circuit 400 are present within the core DC-DC converters 558A-B, in particular the change from implementing the core DC-DC converters 258A-B as dual-active bridge converters 405A-B to implementing the core DC-DC converters 558A-B as core MMCs 505A-B.

An isolated or core MMC 505A includes the submodules 575A-H, submodules 576A-H, and transformer 425A. The core MMC 505B includes the submodules 577A-H, submodules 578A-H, and transformer 425B. Each of the submodules 575A-H-578A-H is implemented as a half or full bridge—in this example, each of the submodules 575A-H-578A-H is a full bridge. An advantage in utilizing the core MMC 505A over the dual-active bridge converter 405A to implement the core DC-DC converter 558A is redundancy. Submodules 575A-D work in concert to create voltage (or potential difference) on one connection point 525A of the transformer 425A, and submodules 575E-H work in concert to create voltage on another connection point 525B of the transformer 425A. By alternating presented potential difference between the submodules 575A-D and submodules 575E-H, a square wave of voltage can be generated across the transformer 425A between the two connection points 525A-B, generating square wave alternating current or multi-phase alternating current if so configured, as well as alternating magnetic fields. Between the other connection points 525C-D on the other side of the transformer 425A, submodules 576A-D work in concert to create voltage (or potential difference) on one connection point 525C of the transformer 425A, and submodules 576E-H work in concert to create voltage on another connection point 525D of the transformer 425A. Submodules 575A-D and submodules 576A-D are driven in complimentary patterns, thereby converting the half of the wave of the intermediary alternating current 452 across the transformer 425A back into the second direct current 454, or into the first direct current 454 is power is coming from the electrical grid 113. Similarly, submodules 575E-H and submodules 576E-H are also driven in complimentary patterns, thereby converting the other half of the wave of the intermediary alternating current 452 across the transformer 425A back into the second direct current 454, or into the first direct current 454 is power is coming from the electrical grid 113.

As submodules 575A-D and 576A-D are driven in complimentary patterns, and submodules 575E-H and 576E-H are driven in opposing patterns, failures of one or more submodules 575A-H 576A-H can be tolerated by the BESS voltage step-up converter circuit 500. A failure of, for example, submodule 575A, can be compensated for by disabling any one of submodules 575E-H, and one of submodules 576A-D, and any one of submodules 576E-H. Disabling any one of submodules 575E-H ensures that the voltage or potential difference between connections 525A-B remains the same on both sides of the opposing cycle. By doing so, the intermediary alternating current 452 produced by the change in potential difference between connections 525A-B would have a peak and a trough of the same absolute difference from zero. To complement this change, submodules 576A-H must be disabled in a similar manner, such that the complimentary wave generated has the same height for peak and trough as the intermediary alternating current 452 waveform 420B, as well having a peak and a trough of the same absolute difference from zero. By doing so, the second direct current 454 waveform 420C will have the same shape as the first direct current 450 waveform 420A.

Multiple failures could occur without affecting the transformation of the first direct current 450 waveform 420A into the intermediary alternating current 452 waveform 420B, and back into the second direct current 454 waveform 420C: in this example up to 75% of the submodules 575A-H, 576A-H could fail, so long as one submodule of 575A-D was operational, one submodule 575E-H was operation, one submodule 576A-D was operational, and one submodule 576E-H was operational.

Each submodule 575A-H, 576A-H can be configured to fully support the power requirements of its respective group 575A-D, 575E-H, 576A-D, 576E-H. In such a configuration, the failure of one or more submodules 575A-H, 576A-H would not reduce the amount of voltage step-up or step down the core MMC 505A was capable of performing, so long as the failures were not so extensive that the core MMC 505A was incapable of performing voltage step-up and step-down at all. In such implementations, it is possible or desirable for the remainder submodules 575B-D of a group of submodules 575A-D to remain idle, while one submodule 575A-D performs all of the switching work for that group of submodules 575A-D. Then, when that working submodule 575A-D requires rest, maintenance, or fails, one submodule 575C of the remaining submodules 575B, D of the group of submodules 575A-D can begin to operate and perform switching work.

The redundancy of the core MMC 505A can be improved by adding additional submodules to any of the submodule groups 575A-D, 575E-H, 576A-D. 576E-H. It may become clear through usage patterns that certain submodules are more prone to failure, such as submodules 576A-H, perhaps due to stress induced by the electrical grid 113. In such cases, additional submodules could be added to the groups 576A-D, 576E-H to improve reliability, without requiring additional submodules on the submodule groups 575A-D, 575E-H on the battery module 110A-N side of the transformer 425A.

Therefore, FIGS. 1, 2, and 5 depict a battery energy storage system (BESS) 100 including a plurality of battery cores 259A-X, wherein each battery core 259A-X includes an array of battery cubes 110A-N, and each battery core 259A-X is configured to provide a first direct current 450 power at a first voltage. The BESS 100 further includes a plurality of direct-current-to-direct-current (DC-DC) converters 558A-B, wherein each DC-DC converter 658A-B is configured to accept the first direct current 450 power and provide a second direct current 454 power at a second voltage. The BESS 100 further includes a main modular multilevel converter (MMC) 104 configured to accept the second direct current 454 power and provide an alternating current 456 at a third voltage.

In some examples, at least one DC-DC converter 558A of the plurality of DC-DC converters 558A-B can comprise a core or isolated MMC 505A-B. The first or main alternating current 456 can be three-phase electric power. Each core DC-DC converter 558A-B can be configured to provide the second voltage of the second direct current 454 power at a set voltage level. The BESS 100 can include a storage dispatch unit or power controller 105, configured to adjust the second voltage provided by the DC-DC converters 558A-B at the battery cubes 110A-N. Therefore, the core DC-DC converter 558A-B can coordinate with the transformer 425A, the battery modules 110A, and/or the storage dispatch unit 105 to alter the voltage experienced where the full bridge 410B connects to the main MMC 104. The core DC-DC converters 558A-B are configured to offer bidirectional flow.

In some examples, the first voltage of each battery core 110A-N going into the submodules 575A-H is a low voltage. The second voltage coming out of the submodules 576A-H into the main MMC 104 is a high voltage, and the voltage coming from the main MMC 104 towards the electrical grid 113 is a high voltage. The voltage coming from the main MMC 104 towards the electrical grid 113 may be a higher high voltage than the second voltage, or it may be a lower high voltage than the second voltage. The second voltage coming out of the submodules 576A-H into the main MMC 104 is a first high voltage, and the voltage coming from the main MMC 104 towards the electrical grid 113 is a second high voltage.

The isolated or core MMC 505A includes at least two submodules 575A, 575E for the first direct current 450, and at least two submodules 576A, 576E for the second direct current 454. A first submodule 575A of the isolated MMC 505A can comprise a half-bridge submodule. A first submodule 575B of the isolated MMC 505B can also comprise a full-bridge submodule.

A first submodule 575A of the isolated MMC 505B is electrically coupled to a second submodule 576A of the isolated MMC 505B. The first submodule 575A receives an incoming power 450 at the first voltage, and provides an interstitial power 452 at an interstitial voltage. The second submodule 576A receives the interstitial power 452, and provides an outgoing power at the second voltage. The interstitial voltage can be greater than the first voltage and less than the second voltage, or can be greater than both the first voltage and the second voltage.

When the BESS 100 is extrapolated and generalized to a more generic energy provisioning system, FIGS. 1, 2, and 5 depict an energy provisioning system as the BESS 100, including a plurality of power sources as the battery cores 259A-X, wherein each power source is configured to provide a first direct current 450 power at a first voltage. The energy provisioning system further includes a plurality of direct-current-to-direct-current (DC-DC) converters 558A-B, wherein each DC-DC converter 558A-B is configured to accept the first direct current 450 power and provide a second direct current 454 power at a second voltage. The energy provisioning system further includes a main modular multilevel converter (MMC) 104 configured to accept the second direct current 454 power and provide an alternating current 456 at a third voltage.

In some related examples, at least one DC-DC converter 558A of the plurality of DC-DC converters 558A-B can comprise a core or isolated MMC 505A-B. The first or main alternating current 456 can be three-phase electric power. Each core DC-DC converter 558A-B can be configured to provide the second voltage of the second direct current 454 power at a set voltage level. The BESS 100 can include a storage dispatch unit or power controller 105, configured to adjust the second voltage provided by the DC-DC converters 558A-B at the battery cubes 110A-N. Therefore, the core DC-DC converter 558A-B can coordinate with the transformer 425A, the battery modules 110A, and/or the storage dispatch unit 105 to alter the voltage experienced where the full bridge 410B connects to the main MMC 104. As the power sources are not batteries, the power sources may not have the capacity to accept energy, only to provide it. In those examples, the core DC-DC converters 558A-B are configured to offer unidirectional flow.

In some examples, the first voltage of each battery core 110A-N going into the submodules 575A-H is a low voltage. The second voltage coming out of the submodules 576A-H into the main MMC 104 is a high voltage, and the voltage coming from the main MMC 104 towards the electrical grid 113 is a high voltage. The voltage coming from the main MMC 104 towards the electrical grid 113 may be a higher high voltage than the second voltage, or it may be a lower high voltage than the second voltage. The second voltage coming out of the submodules 576A-H into the main MMC 104 is a first high voltage, and the voltage coming from the main MMC 104 towards the electrical grid 113 is a second high voltage.

The isolated or core MMC 505A includes at least two submodules 575A, 575E for the first direct current 450, and at least two submodules 576A, 576E for the second direct current 454. A first submodule 575A of the isolated MMC 505A can comprise a half-bridge submodule. A first submodule 575B of the isolated MMC 505B can also comprise a full-bridge submodule.

a first submodule 575A of the isolated MMC 505B is electrically coupled to a second submodule 576A of the isolated MMC 505B. The first submodule 575A receives an incoming power 450 at the first voltage, and provides an interstitial power 452 at an interstitial voltage. The second submodule 576A receives the interstitial power 452, and provides an outgoing power at the second voltage. The interstitial voltage is greater than the first voltage and less than the second voltage.

Figure 6:
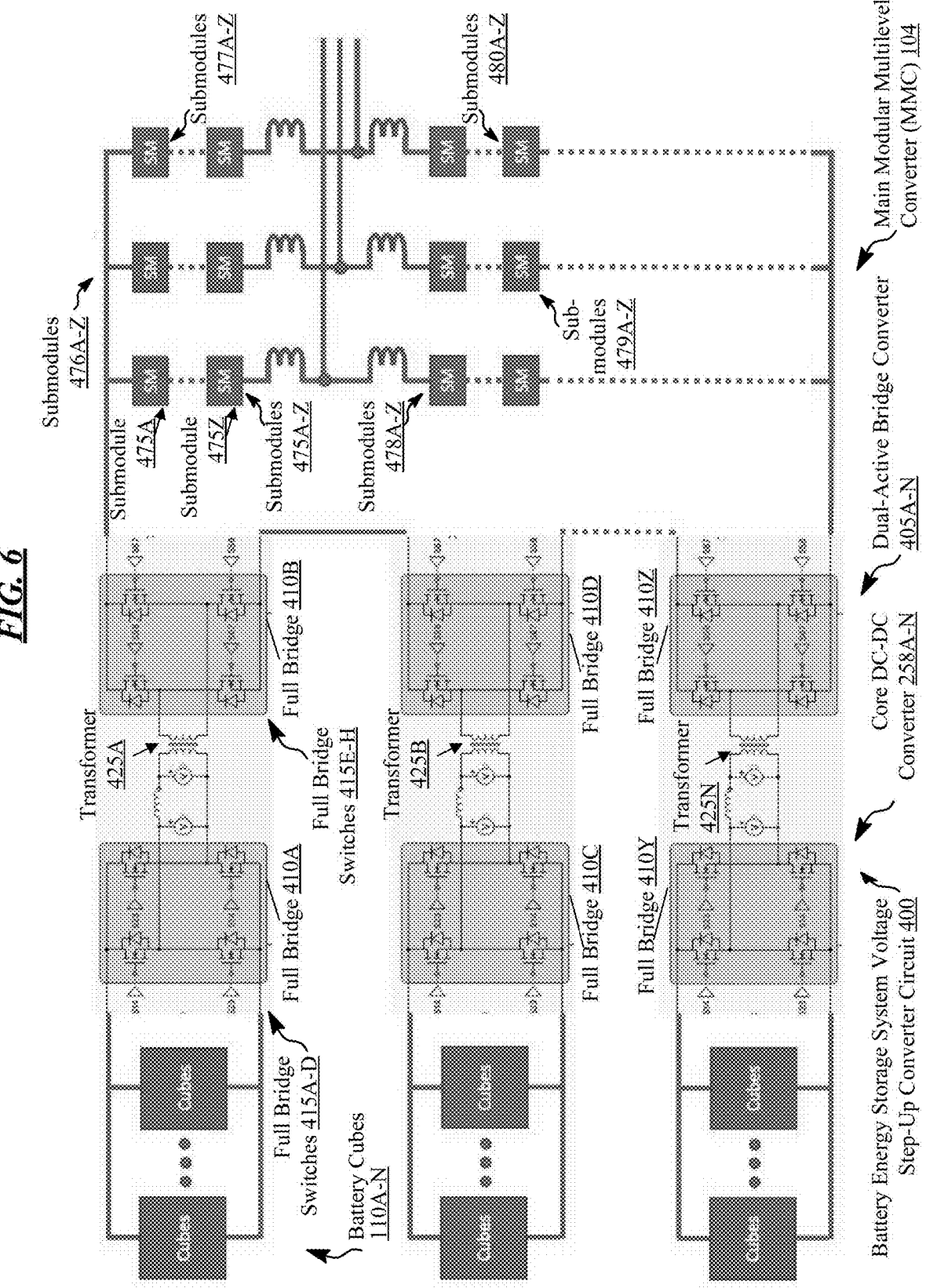
FIG. 6 is a high-level circuit diagram of the BESS voltage step-up converter circuit of FIG. 4 including multiple dual-active bridge converters.

FIG. 6 is a high-level circuit diagram of the BESS voltage step-up converter circuit 400 of FIG. 4 including multiple dual-active bridge converters 405A-N. In this converter circuit 400, multiple dual-active bridge converters 405A-N are depicted as connected in series. However, some or all of the dual-active bridge converters 405A-N can be connected in parallel, or can separately connect to the main MMC 104 or optional main DC-DC converter 158. As discussed above, multiple dual-active bridge converters 405A-N may commutatively provide a higher voltage than expected by the main MMC 104. In such circumstances, the transformer 425A-N can be configured to move the voltage from full bridge 410A,C down to full bridge 410B,D, and move the voltage from full bridge 410B,D up to full bridge 410A,C, in order for the appropriate voltage to be experienced across multiple DC-DC converters 258A-N on their respective full bridges 410B,D connecting to the main MMC 104 or core HV bus 252.

Figure 7:
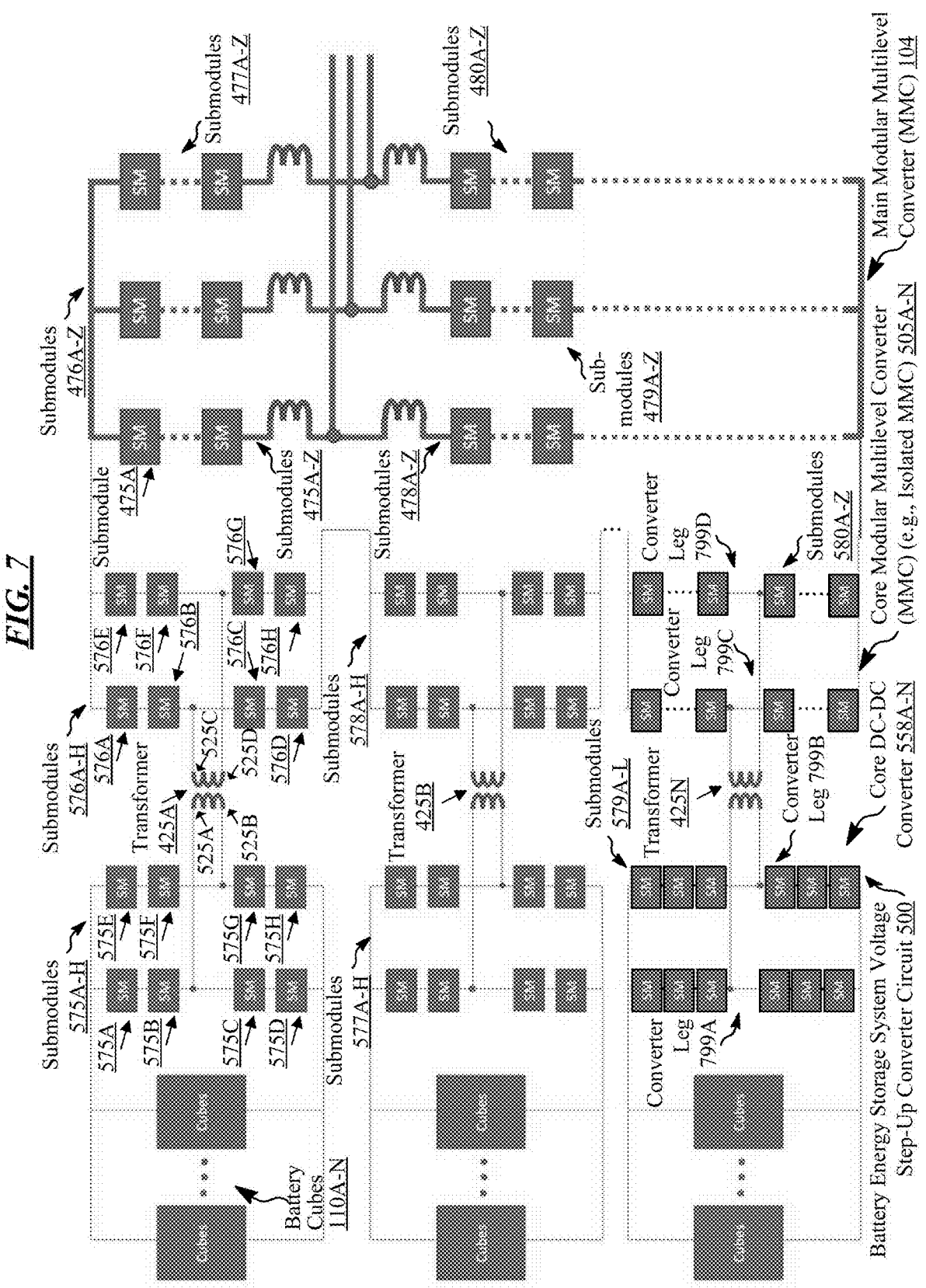
FIG. 7 is a high-level circuit diagram of the BESS voltage step-up converter circuit of FIG. 5 including multiple core-level MMCs.

FIG. 7 is a high-level circuit diagram of the BESS voltage step-up converter circuit 500 of FIG. 5 including multiple core-level MMCs 505A-N. In this converter circuit 500, multiple core-level MMCs 505A-N are depicted as connected in series. However, some or all of the multiple core-level MMCs 505A-N can be connected in parallel, or can separately connect to the main MMC 104 or optional main DC-DC converter 158.

Either side of any transformer 425A-N can have any number of submodules. On the battery modules 110A-N side of transformer 425N, the core-level MMC 505N has six submodules 579A-L on each converter leg 799A-B. On the other side of transformer 425N, the core-level MMC 505N has an arbitrary number of submodules 580A-Z on each converter leg 799C-D. The number of submodules 580A-Z on each converter arm of each converter leg 799C-D do not need to be equal. The number of submodules 580A-Z on each converter leg 799C-D do not need to be equal. The number of submodules 580A-Z does not need to equal the number of submodules 579A-L across the transformer 425N. If the transformer 425N are three or more phase transformers, then more than two converter legs 799A-D can be present on both sides of the transformer 425N.

As discussed above, multiple core-level MMCs 505A-N may commutatively provide a higher voltage than expected by the main MMC 104. In such circumstances, the transformer 425A-N can be configured to move the voltage from submodules 575A-H, 577A-H, 579A-L down to submodules 576A-H, 578A-H, 580A-Z and move the voltage from submodules 576A-H, 578A-H, 580A-Z up to submodules 575A-H, 577A-H, 579A-L, in order for the appropriate voltage to be experienced across multiple core-level MMCs 505A-N on their respective submodules 576A-H, 578A-H, 580A-Z connecting to the main MMC 104 or core HV bus 252.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second, or evident and alternative, and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A battery energy storage system, comprising:
a plurality of battery cores, wherein each battery core of the plurality of battery cores includes an array of battery cubes each comprising a plurality of racks of battery cells, and is configured to provide a first direct current power at a first voltage;
multiple sets of direct-current-to-direct-current (DC-DC) converters wherein each set of the multiple sets of DC-DC converters includes a plurality of DC-DC converters connected in series, wherein each DC-DC converter of the plurality of DC-DC converters includes a dual-active bridge converter configured to provide galvanic isolation to the battery cores and wherein each first DC-DC converter of each set of the multiple sets of DC-DC converters is configured to accept the first direct current power and each last DC-DC converter of each set of the multiple sets of DC-DC converters is configured to provide a second direct current power at a second voltage; and
a main modular multilevel converter (MMC) connected in series with each last DC-DC converter of each set of the multiple sets of DC-DC converters, the main MMC configured to accept multiple inputs of the second direct current power and provide a first alternating current power at a third voltage.

2. The battery energy storage system of claim 1, wherein:
at least one DC-DC converter of each set of DC-DC converters comprises an isolated MMC, each isolated MMC connected in series to the main MMC.

3. The battery energy storage system of claim 2, wherein:
each isolated MMC is configured to offer bidirectional power flow.

4. The battery energy storage system of claim 1, wherein:
the first alternating current power is three-phase electric power.

5. The battery energy storage system of claim 1, wherein:
each last DC-DC converter of each set of DC-DC converters is configured to provide the second direct current power of the second voltage at a set voltage level.

6. The battery energy storage system of claim 1, wherein:
the first voltage of each battery core of the plurality of battery cores is a low voltage;
the second voltage of each set of DC-DC converters is a first high voltage of a greater value and different from the low voltage; and
the third voltage is a second high voltage different from the first high voltage.

7. The battery energy storage system of claim 1, wherein:
at least one DC-DC converter of each set of DC-DC converters is an isolated MMC and includes a plurality of sets of submodules, wherein at least two sets of submodules of the plurality of submodules is for the first direct current power and at least another two sets of submodules of the plurality of submodules is for the second direct current power.

8. The battery energy storage system of claim 7, wherein:
each set of submodules of the plurality of submodules of the isolated MMC comprises a half-bridge submodule.

9. The battery energy storage system of claim 7, wherein:
each set of submodules of the plurality of submodules comprises a full-bridge submodule.

10. The battery energy storage system of claim 7, wherein:
a first set of submodules of the plurality of sets of submodules is electrically coupled to a second set of submodules of the plurality of submodules;
the first set of submodules receives an incoming power at the first voltage, and provides an interstitial power at an interstitial voltage;
the second set of submodules receives the interstitial power, and provides an outgoing power at the second voltage; and
the interstitial voltage is greater than the first voltage and less than the second voltage.

11. The battery energy storage system of claim 1, further comprising:
a power controller, configured to adjust the second voltage provided by the plurality of DC-DC converters, at the array of battery cubes.

12. The battery energy storage system of claim 1, comprising:
a main DC-DC converter connected in series to the main MMC between the main MMC and the multiple sets of DC-DC converters.

13. The battery energy storage system of claim 1, wherein each set of DC-DC converters is connected in parallel with the multiple sets of DC-DC converters.

14. The battery energy storage system of claim 1, wherein the DC/DC converters and/or the main MMC is actively controlled via a storage dispatch unit.

15. An energy provisioning system, comprising:
a plurality of power sources, wherein each power source of the plurality of power sources is configured to provide a first direct current power at a first voltage;
multiple sets of direct-current-to-direct-current (DC-DC) converters wherein each set of the multiple sets of DC-DC converters includes a plurality of DC-DC converters connected in series, wherein each DC-DC converter of the plurality of DC-DC converters includes a dual-active bridge converter configured to provide galvanic isolation to the power sources and wherein each first DC-DC converter of each set of the multiple sets of DC-DC converters is configured to accept the first direct current power and each last DC-DC converter of each set of the multiple sets of DC-DC converters is configured to provide a second direct current power at a second voltage; and
a main modular multilevel converter (MMC) connected in series with each last DC-DC converter of each set of the multiple sets of DC-DC converters, the main MMC configured to accept multiple inputs of the second direct current power and provide an alternating current power at a third voltage.

16. The energy provisioning system of claim 15, wherein:
at least one DC-DC converter of each set of DC-DC converters comprises an isolated MMC, each isolated MMC connected in series to the main MMC.

17. The energy provisioning system of claim 16, wherein:
each isolated MMC is configured to offer unidirectional power flow.

18. The energy provisioning system of claim 15, wherein:
the first alternating current power is three-phase electric power.

19. The energy provisioning system of claim 15, wherein:

Each last DC-DC converter of each set of DC-DC converters is configured to provide the second direct current power of the second voltage at a set voltage level.

20. The energy provisioning system of claim 15, wherein:

the first voltage of each power source is a low voltage;

the second voltage of each set of DC-DC converters is a first high voltage of a greater value and different from the low voltage; and the third voltage is a second high voltage different from the first high voltage.

21. The energy provisioning system of claim 15, wherein:

at least one DC-DC converter of each set of DC-DC converters is an isolated MMC and includes a plurality of sets of submodules, wherein at least two sets of submodules of the plurality of submodules is for the first direct current power and at least another two sets of submodules of the plurality of submodules is for the second direct current power.

\* \* \* \* \*